US011156585B2

United States Patent
Liu et al.

(10) Patent No.: US 11,156,585 B2
(45) Date of Patent: Oct. 26, 2021

(54) METHOD OF NONDESTRUCTIVE TURBINE AIRFOIL INSPECTION AND REPAIR

(71) Applicant: United Technologies Corporation, Farmington, CT (US)

(72) Inventors: Xuan Liu, Glastonbury, CT (US); Andrew DeBiccari, North Branford, CT (US); Zhong Ouyang, Glastonbury, CT (US); Christopher J. Bischof, Southlake, TX (US); William J. Brindley, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 16/271,003

(22) Filed: Feb. 8, 2019

(65) Prior Publication Data

US 2020/0256831 A1    Aug. 13, 2020

(51) Int. Cl.
*G01N 27/82* (2006.01)
*F01D 5/18* (2006.01)

(52) U.S. Cl.
CPC ............. *G01N 27/82* (2013.01); *F01D 5/187* (2013.01); *F05D 2220/32* (2013.01); *F05D 2230/40* (2013.01); *F05D 2240/301* (2013.01); *F05D 2260/83* (2013.01)

(58) Field of Classification Search
CPC ..... G01N 27/82; F01D 5/187; F05D 2220/32; F05D 2230/40; F05D 2240/301; F05D 2260/83
See application file for complete search history.

(56) References Cited

U.S. PATENT DOCUMENTS

| | | | |
|---|---|---|---|
| 5,140,264 A | 8/1992 | Metala et al. | |
| 2003/0167616 A1* | 9/2003 | Harding | B23P 6/002 |
| | | | 29/407.05 |
| 2003/0193331 A1* | 10/2003 | Nath | G01N 27/9046 |
| | | | 324/240 |
| 2008/0028605 A1* | 2/2008 | Lutz | B23P 6/007 |
| | | | 29/889.1 |

FOREIGN PATENT DOCUMENTS

| | | |
|---|---|---|
| DE | 2619897 A1 | 11/1976 |
| JP | 2006010646 A | 1/2006 |

OTHER PUBLICATIONS

Davidov et al. "Application of Magnetic Methods to the Study of the Strain State of Nickel-Based Superalloys", Diagnostics, Resource and Mechanics of materials and structures, Issue 1, 2017, 7 pages.

(Continued)

*Primary Examiner* — Tung X Nguyen
*Assistant Examiner* — Feba Pothen
(74) *Attorney, Agent, or Firm* — Cantor Colburn LLP

(57) ABSTRACT

Disclosed is a method of detecting mixed mode corrosion of a turbine airfoil. The method includes heat treating the turbine airfoil at a temperature of 1600 to 2100° F. in a Ni/Co oxide reducing atmosphere; and scanning the heat treated turbine airfoil with a magnetometer to determine the presence of mixed mode corrosion, wherein the turbine airfoil comprises a nickel superalloy and has internal passages.

16 Claims, 2 Drawing Sheets

(56) References Cited

OTHER PUBLICATIONS

European Search Report for European Application No. 20155896.2, Application Filing Date Feb. 6, 2020; dated Jun. 9, 2020; 10 pages.
Stepanova, et al. "The Structure and Magentic Properties of a Heat-Resistant Nickel-Base Alloy after a High-Temperature Deformation", Institute of Metal Physics, Ural Branchy, Russian Academy of Sciences, Mar. 24, 2011, 9 pages.
Velicheti et al., "Hall coefficient measurement for residual stress assessment in precipitation hardened IN718 nickel-based superalloy", AIP Conference Proceedings 1806, 020012 (2017); doi: 10.1063/1.4974553, 12 pages.

* cited by examiner

METHOD OF NONDESTRUCTIVE TURBINE AIRFOIL INSPECTION AND REPAIR

BACKGROUND

Exemplary embodiments pertain to nondestructive turbine airfoil inspection and turbine airfoil repair.

Some turbine airfoils comprise internal cooling passages. Turbines have severe internal operating conditions and it is desirable to inspect turbine airfoils that have been in service for damage and corrosion. Currently available methods of inspecting for corrosion and repairing corrosion associated damage need improvement and greater sensitivity—particularly methods for inspecting and repairing the internal passages of the airfoils.

BRIEF DESCRIPTION

Disclosed is a method of detecting mixed mode corrosion of a turbine airfoil having internal passages including heat treating the turbine airfoil at a temperature of 1600 to 2100° F. (871 to 1149° C.) in a Ni/Co oxide reducing atmosphere; and scanning an external surface of the heat treated turbine airfoil with a magnetometer to determine the presence of mixed mode corrosion on the internal passages, wherein the turbine airfoil comprises a nickel superalloy.

In addition to one or more of the features described above, or as an alternative to any of the foregoing embodiments, the method further includes comparing the results of scanning to a threshold value.

In addition to one or more of the features described above, or as an alternative to any of the foregoing embodiments, heat treating can occur for 1 to 32 hours.

In addition to one or more of the features described above, or as an alternative to any of the foregoing embodiments, the Ni/Co oxide reducing atmosphere can be a vacuum.

In addition to one or more of the features described above, or as an alternative to any of the foregoing embodiments, the Ni/Co oxide reducing atmosphere can include one or more noble gases, hydrogen, hydrogen fluoride, or a combination thereof.

In addition to one or more of the features described above, or as an alternative to any of the foregoing embodiments, the Ni/Co oxide reducing atmosphere may have a partial pressures of oxygen less than or equal to $10^{-14}$ atmospheres (atm) at 1600° F.

In addition to one or more of the features described above, or as an alternative to any of the foregoing embodiments, the turbine airfoil has an existing thermal barrier coating system and heat treating occurs after removing the existing thermal barrier coating system. Alternatively, heat treating can occur with the existing thermal barrier coating system in place.

Also disclosed is a method of detecting mixed mode corrosion of a turbine airfoil having internal passages including heat treating the turbine airfoil at a temperature of 1600 to 2100° F. (871 to 1149° C.) in a Ni/Co oxide reducing atmosphere; and scanning an external surface of the heat treated turbine airfoil with a magnetometer to determine the presence of mixed mode corrosion on the internal passages, wherein the turbine airfoil comprises a nickel superalloy and further wherein scanning is performed parallel to an internal passage.

In addition to one or more of the features described above, or as an alternative to any of the foregoing embodiments, the method further includes comparing the results of scanning to a threshold value.

In addition to one or more of the features described above, or as an alternative to any of the foregoing embodiments, heat treating can occur for 1 to 32 hours.

In addition to one or more of the features described above, or as an alternative to any of the foregoing embodiments, the Ni/Co oxide reducing atmosphere can be a vacuum.

In addition to one or more of the features described above, or as an alternative to any of the foregoing embodiments, the Ni/Co oxide reducing atmosphere can include one or more noble gasses, hydrogen, hydrogen fluoride, or a combination thereof.

In addition to one or more of the features described above, or as an alternative to any of the foregoing embodiments, the Ni/Co oxide reducing atmosphere may have a partial pressures of oxygen less than or equal to $10^{-14}$ atmospheres (atm) at 1600° F.

In addition to one or more of the features described above, or as an alternative to any of the foregoing embodiments, the turbine airfoil has an existing thermal barrier coating system and heat treating occurs after removing the existing thermal barrier coating system. Alternatively, heat treating can occur with the existing thermal barrier coating system in place.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the methods are presented herein by way of exemplification and not limitation with reference to the Figures.

Figure 1:
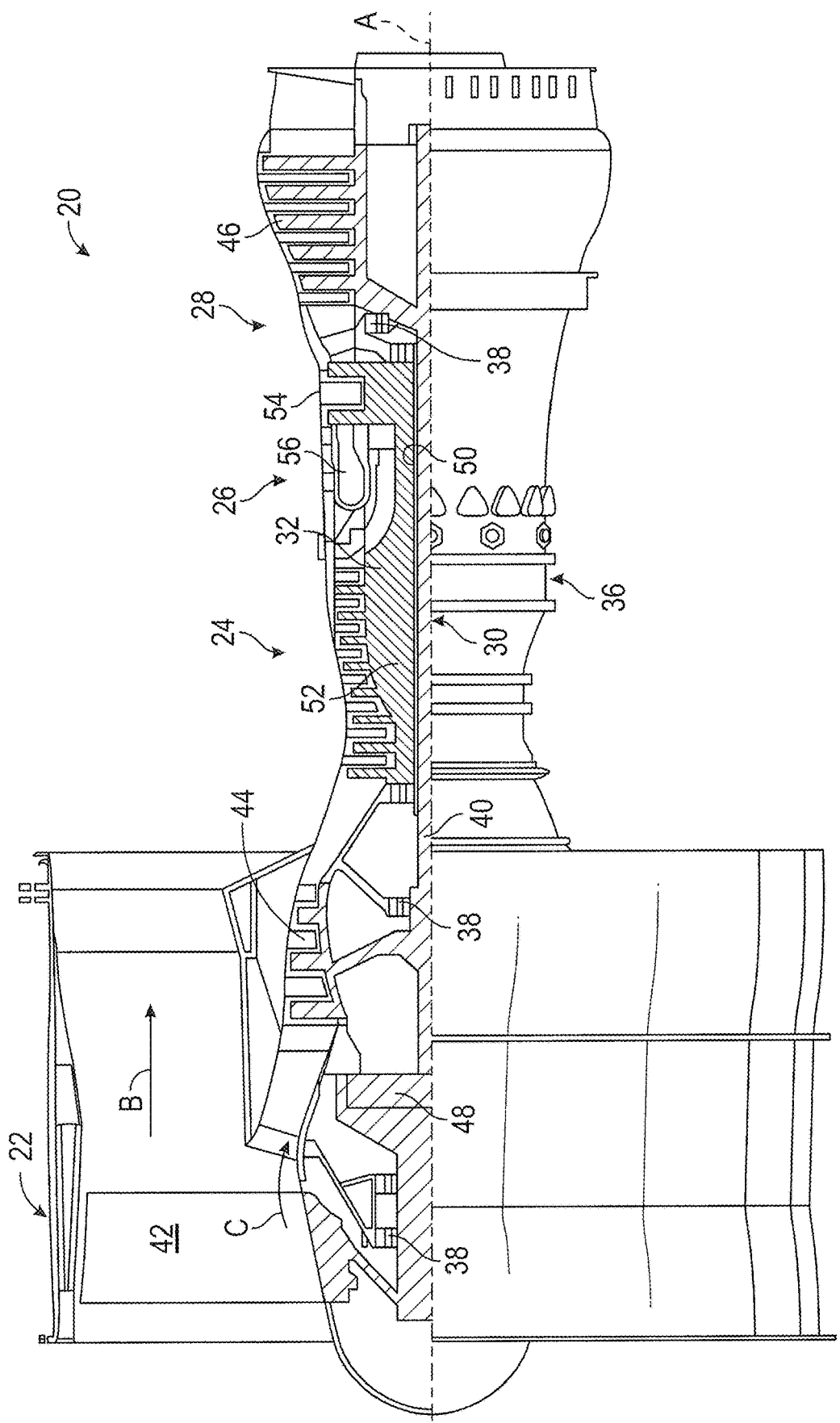
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The high pressure turbine 54 comprise air foils (blades and vanes) having internal passages for cooling. Some low pressure turbines 46 also comprise air foils (blades and vanes) having internal passages for cooling. Once a turbine airfoil has been in use the airfoil must be periodically removed and inspected. While the external surface of the airfoil can be readily inspected using currently available equipment and techniques, nondestructive inspection of the internal passages is more of a challenge due to the restricted access.

Figure 2:
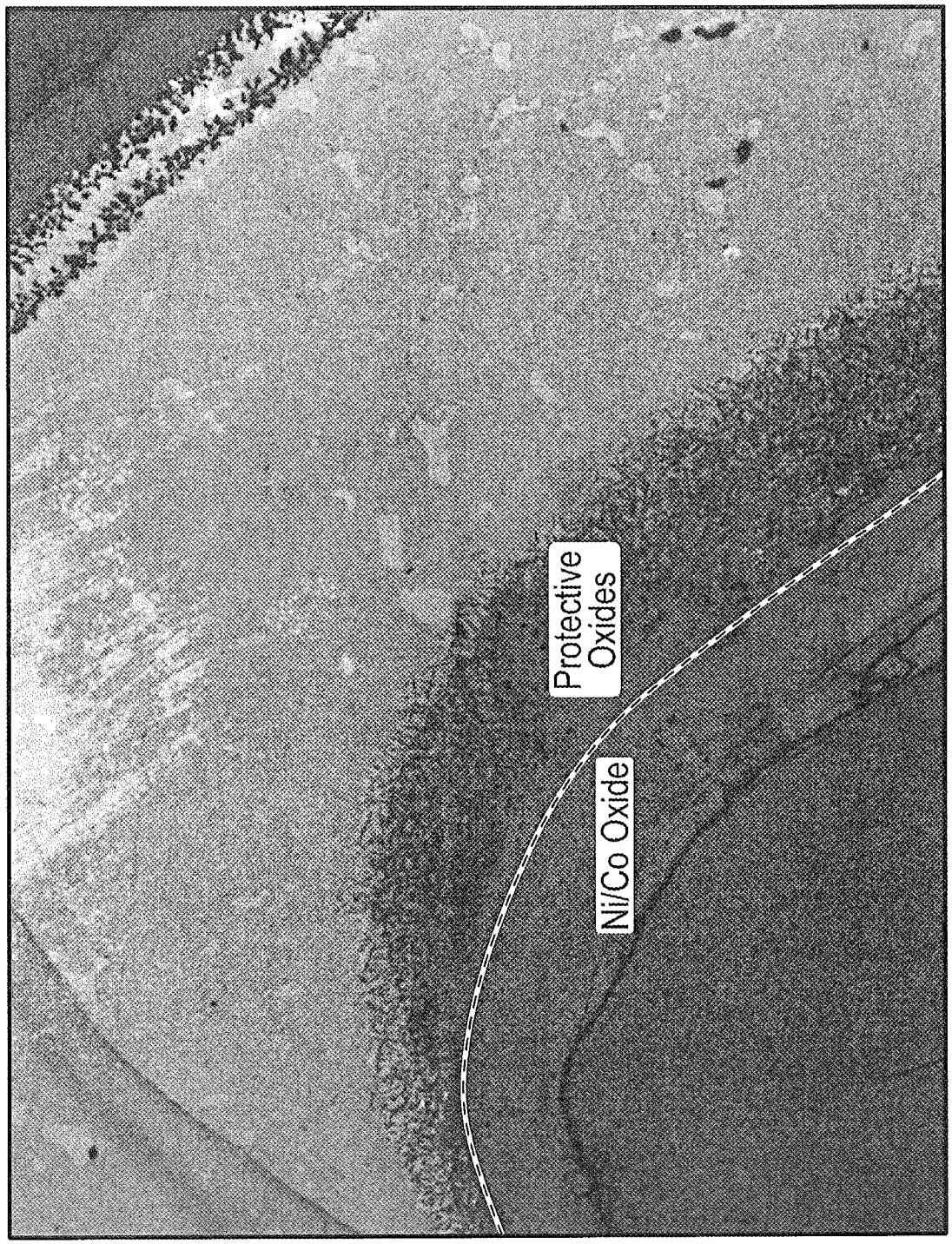
FIG. 2 is an image of mixed mode corrosion in an internal passageway of a nickel superalloy turbine airfoil.

The turbine airfoils are made of nickel superalloys which can undergo corrosion. Normal oxidation creates protective oxides such as aluminum oxide and chromium oxide. Mixed-mode corrosion attacks the nickel superalloy and the surface of the alloy grows nickel oxide and cobalt oxide at relatively fast rates and depletes protective elements such as aluminum, chromium, and tantalum in the nickel superalloy. This leaves a matrix of nickel and cobalt which is low in alloying elements and is also ferromagnetic. Ferromagnetic materials can be detected with a magnetometer. FIG. 2 shows mixed mode corrosion of an internal passage of a nickel superalloy turbine airfoil. Prior efforts to use magnetometry to detect the nickel/cobalt matrix experienced limited success due to the fact that the magnetic readings were low and difficult to detect, particularly when trying to inspect the internal passages of the turbine airfoil.

Disclosed herein is a method to improve the detection of the mixed-mode corrosion. Subjecting the turbine airfoil to a heat treatment having a temperature of 1600 to 2100° F. under a nickel oxide/cobalt oxide (Ni/Co oxide) reducing environment converts nickel oxide to nickel, cobalt oxide to cobalt or both nickel oxide and cobalt oxide to nickel and cobalt respectively and enhances detection of the mixed-mode corrosion using magnetometry.

The method of detecting mixed mode corrosion of a turbine may be performed while the airfoils are located in an assembled engine (on wing or off wing), at the module level, or at the parts level.

A Ni/Co reducing atmosphere is any atmosphere in which nickel oxide can be reduced to nickel, cobalt oxide can be reduced to cobalt, or both nickel oxide and cobalt oxide can be reduced to nickel and cobalt respectively at temperatures of 1600 to 2100° F. Exemplary reducing environments include a vacuum. Exemplary reducing environments also include one or more noble gases, hydrogen, hydrogen fluoride or a combination thereof. The reducing environment may have a low partial pressure of oxygen. A low partial pressure of oxygen is defined as less than or equal to 10-14 atm, or less than or equal to 10-15 atm at 1600° F. As understood by one of ordinary skill in the art, pressure is dependent on temperature. While a low partial pressure of oxygen is defined at 1600° F. a person of skill in the art would be able to determine the equivalent partial pressure of oxygen at another temperature. Such equivalents are included in the definition of low partial pressure of oxygen.

The heat treatment temperature, as disclosed above, may be 1600 to 2100° F. Within this range the heat treatment temperature may be 1800 to 2000° F. The turbine airfoil may be subjected to the heat treatment for 1 to 32 hours. In some embodiments the turbine airfoil is subjected to the heat treatment for 1 to 8 hours. When cooling the airfoil it is may be desirable to cool at a rate of approximately 100° F. per minute. It is also contemplated that the airfoil may not be cooled if the airfoil is being subjected to a repair process.

The heat treatment may be performed with the existing thermal barrier coating system in place or after removing the existing thermal barrier coating system. A thermal barrier coating system is defined as comprising a bond coat and a thermal barrier coating. It may be desirable to perform the heat treatment prior to applying any new thermal barrier coating. In some embodiments the heat treatment is performed twice, once before the existing thermal barrier coating system is removed and again after the thermal barrier coating is removed.

After the heat treatment an external surface of the turbine air foil is scanned with a magnetometer. Useful magnetometers include any magnetometer that can detect relative permeabilities of 1 to 2. Scanning may be performed parallel to the internal passages. Stated another way, scanning may be performed at one or more positions on the external surface that correspond to an internal passage of the airfoil. The scanning result may be compared to a threshold value (an abandonment threshold). If the scanning result is greater than the threshold value then the mixed mode corrosion on the internal passages exceeds the amount that can be repaired in a cost effective manner. If the scanning result is less than the threshold value then the mixed mode corrosion on the internal passages can be repaired in a cost effective manner.

The threshold value can be determined by correlating magnetometer readings to wall thickness where the wall thickness is determined by destructive evaluation. Stated another way, a statistically determined number of airfoils are heat treated, scanned, measured, and sectioned to determine the relationship between the magnetometry results and the amount of remaining wall material. Airfoils can have a range of designs and so the threshold value may be design specific, location specific or both. It is also contemplated that an airfoil of a specified design may have different threshold values at different locations due to the potential complexity of the repair. When there are multiple threshold values per airfoil the scanning result for each location must be less than the threshold value for that location in order for the turbine airfoil to be successfully repaired.

The effectiveness of heat treatment was examined by scanning turbine blades as received at a repair facility with a magnetometer to obtain an average magnetic value across a range of locations. Scanning was on an external surface of the turbine blades at locations corresponding to the location of internal passages as described above. The blades (before or after thermal barrier coating removal) were subjected to a heat treatment of 1975° F. under vacuum for 8 hours. The heat treated blades were scanned with a magnetometer in the same manner as before heat treatment and there was an average of an 80% increase in mixed corrosion detection capability.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting mixed mode corrosion of a turbine airfoil having internal passages comprising:
    heat treating the turbine airfoil at a temperature of 1600 to 2100° F. (871 to 1149° C.) in a Ni/Co oxide reducing atmosphere; and
    scanning an external surface of the heat treated turbine airfoil with a magnetometer to determine the presence of mixed mode corrosion on the internal passages, wherein the turbine airfoil comprises a nickel superalloy.

2. The method of claim 1, further comprising comparing the results of scanning to a threshold value.

3. The method of claim 1, wherein heat treating is for 1 to 32 hours.

4. The method of claim 1, wherein the Ni/Co oxide reducing atmosphere is a vacuum.

5. The method of claim 1, wherein the Ni/Co oxide reducing atmosphere comprises noble gases, hydrogen, hydrogen fluoride, or a combination thereof.

6. The method of claim 1, wherein the Ni/Co oxide reducing atmosphere has a partial pressure of oxygen less than or equal to $10^{-14}$ atmospheres (atm) at 1600° F.

7. The method of claim 1, wherein the turbine airfoil has an existing thermal barrier coating system and heat treating occurs after removing the existing thermal barrier coating system.

8. The method of claim 1, wherein the turbine airfoil has an existing thermal barrier coating system and heat treating occurs with the existing thermal barrier coating system in place.

9. A method of detecting a turbine airfoil having mixed mode corrosion comprising:
    heat treating the turbine airfoil at a temperature of 1600 to 2100° F. (871 to 1149° C.) in a Ni/Co oxide reducing atmosphere; and
    scanning an external surface of the heat treated turbine airfoil with a magnetometer to determine the presence of mixed mode corrosion on the internal passages, wherein the turbine airfoil comprises a nickel superalloy and further wherein scanning is performed parallel to an internal passage.

10. The method of claim 9, further comprising comparing the results of scanning to a threshold value.

11. The method of claim 9, wherein heat treating is for 1 to 32 hours.

12. The method of claim 9, wherein the Ni/Co oxide reducing atmosphere is a vacuum.

13. The method of claim 9, wherein the Ni/Co oxide reducing atmosphere comprises noble gases, hydrogen, hydrogen fluoride, or a combination thereof.

14. The method of claim 9, wherein the Ni/Co oxide reducing atmosphere has a partial pressure of oxygen less than or equal to $10^{-14}$ atmospheres (atm) at 1600° F.

15. The method of claim 9, wherein the turbine airfoil has an existing thermal barrier coating system and heat treating occurs after removing the existing thermal barrier coating system.

16. The method of claim 9, wherein the turbine airfoil has an existing thermal barrier coating system and heat treating occurs with the existing thermal barrier coating system in place.

* * * * *